Nov. 23, 1954 H. L. DONLEY 2,695,357

FREQUENCY CONVERSION APPARATUS

Filed April 19, 1951

INVENTOR
Hugh L. Donley
BY Morris [signature]
ATTORNEY 2,695,357

FREQUENCY CONVERSION APPARATUS

Hugh L. Donley, Princeton, N. J., assignor to Radio Corporation of America, a corporation of Delaware Application April 19, 1951, Serial No. 221,860

8 Claims. (Cl. 250—20)

This invention relates to an improved apparatus for converting electrical oscillations of one frequency into electrical oscillations of another frequency. More particularly, the invention relates to a frequency converter in which the voltage to drive a mechanical resonator is applied to one or more driving plates of a material having non-linear reactance and electromechanical transducing properties and in which the driving voltage of desired frequency may be derived from the mixing action of these same driving plates.

In certain types of radio receiver circuits, as well as in other electronic circuits, electrical oscillations of one radio frequency must be converted to oscillations of another frequency. In the past, it has been conventional to employ a vacuum tube mixer, or heterodyne converter, for this purpose. It has also been known, as shown in Patent 2,370,720, to employ a circuit which includes a saturable magnetic core.

Vacuum tube circuits have the disadvantage of tube noises and the consequent problem of signal to noise ratio to be considered. Vacuum tubes are also limited in life and must be replaced frequently. Consequently, there are applications in which it is desired to eliminate as many vacuum tubes as possible and to, if possible, obtain increased stability of operation with lowest cost of construction. The apparatus of the present invention offers these advantages.

One object of the present invention is to provide improved apparatus for accomplishing frequency conversion.

Another object of the invention is to provide an improved frequency conversion apparatus applicable to radio receivers of the heterodyne or superheterodyne types.

Another object is to provide an improved apparatus and method of mixing two frequencies to obtain a third frequency.

Other objects of the invention are to provide improved frequency converting apparatus with excellent stability of operation, simplicity of construction, and low cost of operation.

Figure 1:
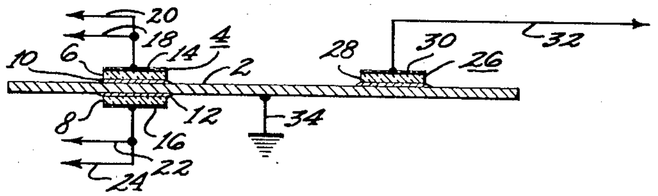
Figure 2:
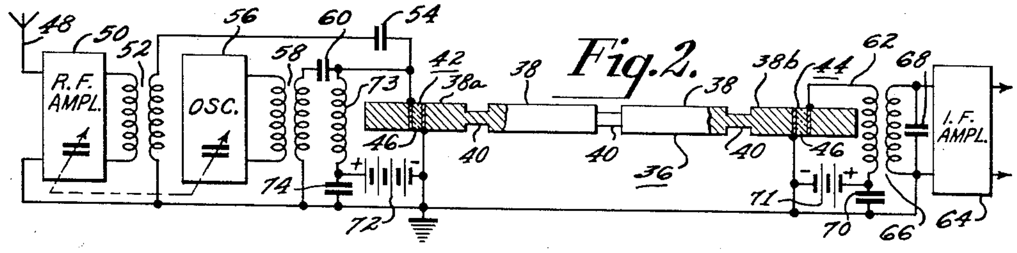
Figure 3:
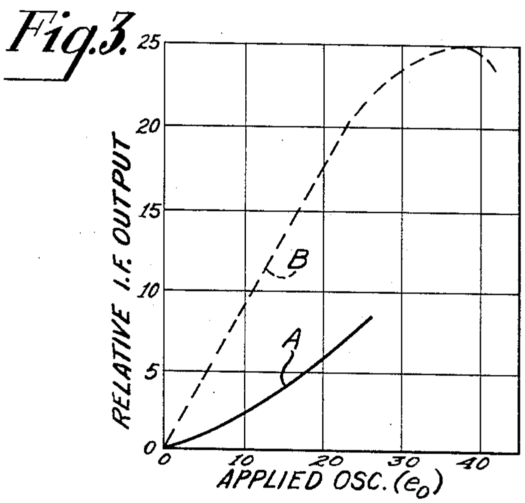
Figure 4:
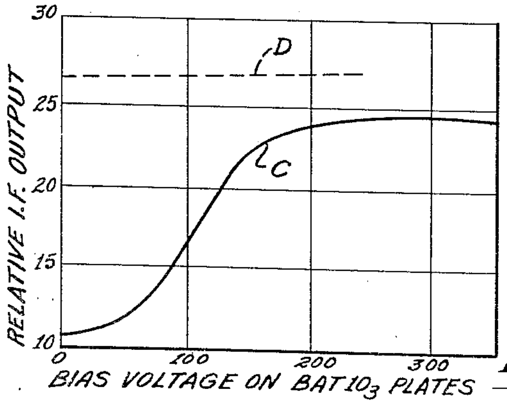
Figure 5:
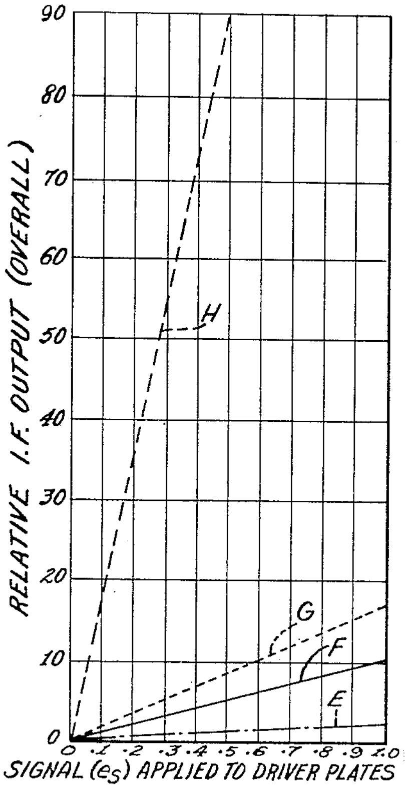

These and other objects will be more apparent and the invention will be more readily understood from the following detail description and the accompanying drawings of which:

Figure 1 is an elevation view, partly in cross section and partly diagrammatic, of a preferred embodiment of apparatus for frequency conversion constructed in accordance with the present invention, Figure 2 is a schematic diagram of an essential circuit utilizing a mechanical filter unit of the present invention but in which the filter unit is of a different type than that shown in Figure 1, Figure 3 is a graph of I. F. output voltage vs. applied oscillator voltage applied to the driver plates of the apparatus of Figure 1 when the driver plates are composed of barium titanate ceramic prepolarized at 400 v. and with 1 v. signal voltage, Figure 4 is a graph showing two curves of I. F. output, vs. bias voltage on the ceramic driver plates of the apparatus of Figure 1, one of the curves being for harmonic and the other being for fundamental operation when signal voltage is 1 and oscillator voltage is 25, and Figure 5 is a graph including four curves of relative overall I. F. output vs. signal voltage applied to the driver plates of the apparatus of Figure 1, two of the curves being for fundamental mixing, with and without bias applied to the driver plates, and the other two curves being for harmonic mixing.

Briefly described, the present invention comprises improved apparatus for converting electrical oscillations of a first frequency, or band of frequencies, into electrical oscillations of another frequency or band of frequencies. The conversion apparatus includes a mechanical filtering unit having in driving relationship therewith a capacitor driving unit. The capacitor unit includes at least one ceramic body having nonlinear reactance properties and electromechanical transducing properties. Voltages of two different frequencies, one of which is the frequency to be converted, are applied to the capacitor unit causing the ceramic body to vibrate at a resultant frequency which may be the sum or difference of the two applied frequencies or the sum or difference of one frequency and a harmonic of the other. Vibration of the ceramic plate is transmitted to the filtering unit causing it to vibrate in unison. The apparatus also includes means responsive to vibration of the filter unit for converting the mechanical vibrations of the filter unit into corresponding electrical oscillations.

A preferred embodiment of a simple conversion unit for converting a voltage of a single frequency into another desired frequency and constructed in accordance with the principles of the present invention, will now be described.

Referring to Figure 1, one embodiment frequency converting apparatus includes a filter unit which may comprise a full wavelength bar 2 of any material having sufficient rigidity and elasticity which will enable it to be vibrated readily. When the frequency of fundamental resonant vibration desired is about 50 kc., for example, the bar may be of aluminum and may have a length of about 4 inches. Neither the thickness nor the width of the bar is critical but, for convenience, the bar may be fabricated so that it has a width about ¼ inch and a thickness of about 1/16 inch.

A driving means 4 is provided for mechanically vibrating the bar 2. This driving means may comprise a dual capacitor unit having two thin plates 6 and 8 of a barium titanate non-linear, ceramic, high dielectric material mounted on opposite faces of the bar. These plates may have dimensions of say ½ inch by ¼ inch in area and a thickness of 20 mils but this is by no means critical. The plates 6 and 8 are united to opposite faces of the filter bar with layers of solder 10 and 12 and the exposed major face of each plate is plated with a thin film of metal 14 and 16, such as silver. The edges of the plates are not metal-coated. In order to apply maximum driving force to the bar, the capacitor plates should be attached at a quarter wavelength point. Instead of the preferred pair of plates, a single plate of larger area than either one of the plates 6 or 8 may be used.

Each of the capacitor units is provided with a pair of leads 18, 20 and 22, 24, respectively, each pair being soldered to its ceramic plate in a single connection. The leads 18 and 22 are connected to a source of the frequency being converted. This may be an R. F. signal generator, as shown in Figure 2. The other lead, 20 or 24, of each pair, is connected to a source of voltage having a frequency which is to be mixed with the signal frequency. This may be an R. F. oscillator, as also shown in Figure 2.

The filter bar is also provided with means for converting the mechanical vibrations of the bar into corresponding electrical oscillations. This may comprise another capacitor unit 26 which includes a thin plate 28 of barium titanate ceramic material similar in dimension and composition to the plates 6 and 8 included in the driving means. The ceramic plate 28 is soldered to either major face of the bar, preferably at another quarter wavelength point. The exposed major face of the plate is given a thin coating 30 of a metal, such as silver, and provided with a lead 32.

The filter bar is also provided with a ground connection 34. The bar may mounted in any suitable manner, to permit free vibration. For example, it may be simply suspended by its leads or clamped at nodal points. If the clamps are applied at the sides of the bar they will not interfere with the capacitor units. The mechanical filter unit, constructed as above described, is a particular type that can be used only in special applications where conversion of only a single frequency to another single frequency is desired.

A type of filter unit having much broader application is included in Figure 2. This unit comprises a bar of metal 36, having a plurality of sections 38 of a particular diameter and joined by connecting sections 40 of lesser diameter. Each of the end sections 38*a* and 38*b* has a ceramic driving or pick up unit 42 and 44, respectively, of similar construction, included therein. Each of these ceramic units comprises a thin ceramic plate 46 having a diameter the same as that of the filter bar section in which it is included, soldered between halves of the filter bar section. The filter bar section is cut transversely to permit insertion of the ceramic.

Lead connections are made to either side of the ceramic plate in the same manner as described in connection with the filter unit of Figure 1.

This filter unit is capable of passing an entire band of frequencies and may therefore be utilized in radio receiver applications.

Continuing to refer to Figure 2, as in a superheterodyne receiver, an R. F. signal of a particular frequency, or band of frequencies, may be picked up by an antenna 48 and amplified by an R. F. amplifier 50. The output of the R. F. amplifier may be coupled to the ceramic unit 42 through a transformer 52 and tuning capacitor 54. In a practical experimental example, the signal frequency was 153 kc.

A voltage of a second frequency is also applied to the ceramic driving unit from a second source such as an oscillator 56. This voltage may be coupled to the plates of the unit 42 through a transformer 58, and a capacitor 60. The second frequency depends upon the frequency, or band of frequencies, into which it is desired to convert the signal frequency. If, for example, it is desired to convert the signal frequency into an intermediate frequency voltage signal of 50 kc., the filter bar is designed so that it will resonate within a band of frequencies including 50 kc. and the oscillator 56 may be adjusted to have an output frequency of 203 kc.

When the two frequencies are applied to the driver unit, two distinct effects result. Since the barium titanate ceramic driver plate has electromechanical transducing properties, the varying voltage across the metallic plates of the capacitor causes the ceramic to vibrate. Due to the mixing properties of the ceramic, the frequency of vibration is the difference of the two applied frequencies. It could also be the sum of the two frequencies. It has previously been known that certain ceramics such as the barium titanate high dielectric ceramics have nonlinear properties which enable them to act as mixers.

In the past, however, when the electromechanical transducing and the mixing properties of the ceramic have been utilized it has been customary to feed the intermediate frequency of the output directly to an I. F. amplifier with the usual vacuum tube circuits. However, the type of frequency signal obtained by this method is not as sharp and free from side band effects, and the like, as may be desired for some purposes.

In the present invention, the vibration of the ceramic driver plates sets the filter bar in vibration at a resonant frequency.

Still referring to Figure 2, vibrations of the filter bar are communicated to the transducer unit 44 which is also caused to vibrate at the resonant frequency of the bar. The electromechanical properties of the ceramic plate 46 of the transducing unit 44 cause the mechanical vibrations to be converted into corresponding electrical oscillations which may be fed through an output lead 62 to any output utilization circuit such as an I. F. amplifier 64. From the I. F. amplifier the signal may be fed to an audio detector and conventional audio amplifier and reproducing system as in a superheterodyne radio receiver.

The output of the transducing unit 44 is coupled to the I. F. amplifier through a transformer 66 having a tuning capacitor 68 in parallel with its secondary. A bypass capacitor 70 is connected between the primary of the transformer and ground. Although not absolutely necessary, a source of D.-C. bias voltage, such as a battery 71 may be connected across the solder electrodes of the ceramic plate 46 and in series with the primary of the transformer 66. The use of a bias voltage on the transducer unit raises the strength of the output signal obtained therefrom. In some cases, a bias voltage is not required however. The ceramic plate 46 may be prepolarized and the residual bias remaining after the polarizing voltage is removed may be relied upon.

Higher I. F. voltage output is obtained when the resultant mixer voltage has a frequency which is the sum or difference of the signal voltage frequency and a harmonic of the oscillator voltage frequency than when it is equal to the sum or difference of the signal voltage frequency and the fundamental of the oscillator frequency. This is illustrated in Figures 3 and 4. In Figure 3, relative I. F. output voltage is plotted against applied oscillator voltage. As shown by curve A, there is a substantially linear relationship between I. F. output and applied oscillator voltage when the fundamental oscillator frequency is utilized. There is also a linear relationship when the harmonic frequency of the oscillator is utilized but the output is generally much higher in the latter case, as shown by curve B. In one case, as an example, the operating frequency of the bar was 50 kc., signal frequency 153 kc., and oscillator frequency 101.5 kc. Signal voltage was 1 volt. Resultant frequency of the mixer was 153—[2(101.5)].

The effect on fundamental and harmonic operation output of utilizing a bias voltage on the ceramic driver plates is shown in the graph of Figure 4. Means for applying a D.-C. bias to the plates of the driver unit is shown in Figure 2. As shown in Fig. 2, a battery 72 and an inductance 73 in series are connected across metal electrodes of the ceramic plate of the capacitor unit 42. A bypass capacitor 74 is also connected to a point between the inductance 73 and the battery, and ground. Signal voltage is 1 and oscillator voltage 25 in this example.

Curve C of Figure 4 is for operation on the fundamental oscillator frequency. This curve shows that, until the bias voltage reaches a value equal to about 5 times the oscillator voltage, an increase in bias voltage causes a sharp increase in I. F. output voltage. Also, curve D, which is the curve for harmonic operation of the oscillator, shows that the I. F. output for harmonic operation remains above the output for fundamental operation although the difference becomes much less when the bias voltage is increased. Harmonic operation output voltage is nearly independent of bias voltage.

It has also been found that when the bias voltage is kept constant, an increase in signal voltage produces a corresponding increase in relative I. F. voltage output. The increase is much greater when a bias voltage is applied to the driver plates than when no bias is applied and harmonic operation of the oscillator results in much greater increases than fundamental operation. Referring to Figure 5, curves E and F are for fundamental operation with 0 and 160 v. bias respectively. Curves G and H are for harmonic operation with 0 and 160 volts bias respectively. The oscillator was operated at 10 volts.

Various substitutions can be made within the scope of the present invention without departing from the scope thereof. The full wavelength bar, shown in Figure 1, may be replaced with a bar having some fractional part of the wavelength of the operating frequency desired, or may be replaced with a band pass filter as shown in Figure 2, or may be several wavelengths long. The material of the bar can be anything which has good elasticity and rigidity and to which the driver plates can be united. Alloys of aluminum and magnesium, steels, brass, etc. may be used.

Ceramic materials other than straight barium titanate can also be used for the transducer plates. For example, barium-strontium titanates can be used, also combinations of barium titanate and various stannates.

Besides the arrangement of the ceramic plates shown in Figures 1 and 2, various other forms may be used. For example, the ceramic may be a sleeve which fits snugly around the filter bar.

In practical operation, of the apparatus, the circuits are tuned such that they offer a high impedance to all the frequencies involved. This tuning is aided by proper selection of capacitor values. The objective is, of course, to apply the highest percentage of the available signal voltage to the driver unit.

What is claimed is:

1. An apparatus for electromechanically converting electrical oscillations of a first frequency into electrical oscillations of a second frequency, comprising a mechanical filter bar capable of vibration at said second frequency, means for driving said bar at said second frequency, said driving means comprising a capacitor element of which the dielectric comprises a body of material having non-linear reactance and electromechanical transducing properties, said bar being positioned to vibrate in response to vibration of said body, means for applying a voltage of said first frequency to said driving means, means for applying a voltage of another frequency to said driving means such that said body will vibrate at said second frequency and whereby said bar will also be caused to vibrate at said second frequency, and means responsive to the mechanical vibrations of said bar for converting said mechanical vibrations into corresponding electrical oscillations.

2. Apparatus according to claim 1 in which said filter bar is a full wavelength bar.

3. Apparatus according to claim 1 in which said dielectric is a barium titanate ceramic material.

4. Apparatus according to claim 3 including means for applying a direct current bias voltage to said capacitor element.

5. Apparatus according to claim 1 in which said filter bar is a band pass filter.

6. Apparatus according to claim 1 in which said capacitor element is positioned at a quarter wavelength point of said bar.

7. Apparatus according to claim 1 in which said another frequency is a harmonic of a frequency that can be mixed with said first frequency to obtain said second frequency.

8. Apparatus according to claim 1 in which said means responsive to mechanical vibrations of said bar is a body of material having electromechanical transducing properties.

References Cited in the file of this patent

UNITED STATES PATENTS

| Number | Name | Date |
|---|---|---|
| 1,719,484 | Norton | July 2, 1929 |
| 1,732,710 | Batsel | Oct. 22, 1929 |
| 1,794,365 | Chireix | Mar. 3, 1931 |
| 2,387,472 | Sontheimer | Oct. 23, 1945 |
| 2,402,518 | Wainer | June 18, 1946 |
| 2,461,307 | Antalek | Feb. 8, 1949 |
| 2,501,488 | Adler | Mar. 21, 1950 |
| 2,539,268 | Noble | Jan. 23, 1951 |
| 2,571,019 | Donley et al. | Oct. 9, 1951 |

FOREIGN PATENTS

| Number | Country | Date |
|---|---|---|
| 641,373 | Great Britain | Aug. 9, 1950 |